United States Patent
Gilli

(10) Patent No.: US 7,799,380 B2
(45) Date of Patent: Sep. 21, 2010

(54) INK FOR SILK-SCREEN PRINTING AND CORRESPONDING PRINTING TECHNIQUE

(75) Inventor: Alberto Gilli, Anezeno (IT)

(73) Assignee: CANDIS S.r.l., Turin (IT)

( * ) Notice: Subject to any disclaimer, the term of this patent is extended or adjusted under 35 U.S.C. 154(b) by 63 days.

(21) Appl. No.: 11/758,186

(22) Filed: Jun. 5, 2007

(65) Prior Publication Data

US 2007/0231585 A1    Oct. 4, 2007

Related U.S. Application Data

(63) Continuation of application No. 10/897,095, filed on Jul. 23, 2004, now Pat. No. 7,291,209.

(30) Foreign Application Priority Data

Jul. 25, 2003    (IT)    .......................... TO2003A0572

(51) Int. Cl.
    *B05D 1/32*    (2006.01)

(52) U.S. Cl. ..................... 427/282; 427/561; 427/565; 427/568; 427/257; 427/199; 427/372.2; 427/280; 428/141; 428/143; 428/215; 428/331; 428/328; 428/424.4; 428/483; 428/913.3

(58) Field of Classification Search ................ 427/282, 427/561, 565, 568, 704, 199, 257, 372.2, 427/387.2, 280; 428/141, 143, 215, 331, 428/328, 424.4, 483, 913.3
    See application file for complete search history.

(56) References Cited

U.S. PATENT DOCUMENTS

| | | | |
|---|---|---|---|
| 3,506,474 A | 4/1970 | Neuhaus et al. | |
| 3,829,323 A | 8/1974 | Kirch | |
| 3,935,147 A | 1/1976 | Godshalk et al. | |
| 4,812,336 A | 3/1989 | Okamoto et al. | |
| 5,067,400 A | 11/1991 | Bezella et al. | |
| 5,620,772 A | 4/1997 | Taniguchi | |
| 6,544,372 B2 | 4/2003 | Link | |
| 6,748,856 B2 * | 6/2004 | Witte | ......................... 101/129 |
| 2001/0009697 A1 * | 7/2001 | Ripstein | ................... 427/407.1 |
| 2004/0241416 A1 * | 12/2004 | Tian et al. | ................ 428/304.4 |

FOREIGN PATENT DOCUMENTS

| | | |
|---|---|---|
| DE | 3718561 A1 | 12/1988 |
| EP | 1340628 A1 | 9/2003 |
| JP | 62290773 | 2/1987 |
| JP | 0114575 | 11/1989 |
| WO | WO 02/22953 A1 | 3/2002 |

* cited by examiner

*Primary Examiner*—Michael Kornakov
*Assistant Examiner*—Xiao Zhao
(74) *Attorney, Agent, or Firm*—Sughrue Mion, PLLC

(57) ABSTRACT

The present invention relates to inks for silk-screen printing technique, as well as the corresponding printing technique, designed to bestow upon the reproduction obtained by means of the use of said inks on an appropriate substrate, preferably of a paper type, a particular feel, preferably a particular roughness or coarseness. In particular, the present invention relates to an ink for silk-screen printing of catalogues or advertising leaflets for products designed for decorative wall coatings that will reproduce also the feel of the final decoration applied on the wall substrate.

27 Claims, No Drawings

INK FOR SILK-SCREEN PRINTING AND CORRESPONDING PRINTING TECHNIQUE

This is a continuation of application Ser. No. 10/897,095 filed Jul. 23, 2004 now U.S. Pat. No. 7,291,209. The entire disclosure of the prior application, application Ser. No.) 10/897,095 is hereby incorporated by reference.

FIELD OF THE INVENTION

The present invention relates to inks for silk-screen printing, as well as the corresponding printing technique, designed to bestow upon the reproduction obtained by means of the use of said inks on an appropriate substrate, preferably of a paper type, a particular feel, preferably a particular roughness/coarseness.

BACKGROUND ART

Silk-screen printing is a printing process which uses a form—referred to as frame or sieve—constituted by a fabric with a very fine mesh, which is left permeable to the ink in the areas of image to be reproduced and impermeable in the other areas.

The frame is formed by a network that can be made with threads of polyester, nylon or steel stretched over iron or aluminium frames of variable size at a tension of 4-7 bar with a more or less fine mesh according to the chromatic effect that it is desired to obtain, and bears the form of the pattern to be reproduced. Frames normally used for silk-screen printing have a woof that can range from 10 to 150 threads/cm$^2$ according to the type of ink or paint product used and the amount thereof to be released onto the substrate.

Preparation of the frame can be performed manually by tracing thereon with a lithographic crayon the pattern that it is intended to reproduce. This closes with its trace the underlying layers between the woof and the warp. Next, with a special glue, all the spaces not involved in the pattern are closed, and then, using a solvent (alcohol or benzene), all of the thick trace of the crayon is removed, exposing the holes that had been occluded. Preparation of the frame can also be performed mechanically, in particular photomechanically.

Printing may be manual or carried out using special machines. In the first case, the ink is distributed using a spatula, referred to as doctor blade or doctor knife, over the sieve stretched over the appropriate frame.

The doctor blade, in fact, by applying pressure as it slides from one end to the other of the frame causes passage through the network of the ink on the substrate that is to be printed. The average thickness of dry ink deposited for each pass is between 50 and 100 μm.

The machinery used for silk-screen printing is substantially made up of surfaces that apply suction pressure and/or that use special glues either in line or rotating on a carousel with one to eight colours and intermediate drying hoods with IR or UV lamps or hot-air lamps. Said drying devices may moreover be equipped with travelling bands or belts of the length necessary for polymerization of the ink of the paint product used or can carry out manual drying on frames, which can be set on top of one another. This machinery may moreover be equipped with a sheet-in/sheet-out device.

The silk-screen printing system is used generally for printing of fabrics, packaging made of paper, aluminium or plastic materials, road signs and also in the decoration of furniture, crockery and toys.

Printing inks are generally formed by a dyeing part and by a binding part. The dyeing part can be obtained with pigments and with soluble dyes, where by "pigment" is meant an insoluble coloured compound in the binder of the ink, whilst by "soluble dye" is meant a coloured compound that is soluble in the binder. In turn, the binder is constituted by a vehicle, a modifier of the vehicle, and a solvent.

The typical composition of an ink is given in Table 1.

TABLE 1

| Dyeing part | | Binding part | | |
|---|---|---|---|---|
| Pigment | Soluble dye | Vehicle | Modifier | Solvent |
| Organic (transparent) Inorganic (covering) | (transparent) | Natural resins Synthetic resins | Plastifiers Waxes Oils Wetting agents Stabilizing agents Anti-foaming agents Drying agents | Aliphatic compounds Aromatic compounds Ketones Esters Water |

The dyeing part determines the chromatic characteristics of the ink. The organic pigments are characterized by a good transparency, with the exception of carbon black, which is semi-covering, and fluorescent pigments which are covering.

The inorganic pigments possess high covering-power characteristics with the exception of some colours that are transparent (iron blue) or semi-covering (china clay, calcium carbonate, aluminium hydrate). The soluble dyes are, instead, characterized by a very high transparency.

The intensity of the colours is adjusted with covering or transparent thick white inks.

The binding part of a printing ink is constituted, as has been seen, by a vehicle, a modifier, and a solvent.

The vehicle is constituted basically by natural or synthetic resins that bestow upon the ink fundamental characteristics from the chemico-physical standpoint.

Natural resins have had a considerable importance in the formulation of printing inks. Currently, the tendency is, however, to replace them with resins of a synthetic type.

Synthetic resins can be used by themselves or mixed together, and, in a few cases, also mixed with natural resins, should there exist a good degree of compatibility, where by "compatibility" is meant the possibility for two or more resins to form a homogeneous and stable solution that does not give rise over time to phenomena of separation, precipitation, or clouding.

The main resins used are resins of an epoxy, vinyl, hydrocarbon, nitro-cellulose, maleic, melamine, phenol-formaldehyde, urea-formaldehyde, alkyd, polyester, acrylate, or polyurethane type.

Modifiers are used to bestow upon the inks particular characteristics, such as for example plasticity, flexibility, mechanical surface resistance, etc. Esters of phthalic, sebacic and glycolic acids are generally used as plastifiers; as regards waxes, natural ones, such as for example carnauba wax, or synthetic ones, for example polyethylene, are used; as regards oils, linseed, soya and wood oils may be used; finally, as dessicators the salts of manganese, zinc, cobalt and zirconium of naphthene, octoic and linoresinic acids are used.

The solvents have an extremely important dual function: they must bestow upon the ink the fluidity necessary for enabling transfer from the printing form (sieve or frame) to the substrate, and must moreover constitute the mobile phase of the ink-drying process, i.e., the component that must be removed either by penetration or by evaporation or by selective filtration at the moment of application of the ink on the substrate.

The film of ink that remains on the material has a constant thickness, in all cases much greater than that of the typographic and lithographic processes; as a result it achieves much greater covering-power effects. This enables prints with high resistance to light and to chemical agents to be obtained. Furthermore, the system does not call for high printing pressures that are necessary in other processes.

SUMMARY OF THE INVENTION

The purpose of the present invention is the development of inks for silk-screen printing on a substrate, preferably but not exclusively of a paper type, which will be capable of bestowing upon the reproduction thus obtained a particular feel of coarseness/roughness and thickness.

The present invention relates more preferably to an ink for silk-screen printing on the paper substrate of catalogues or advertising leaflets, for products designed for decorative wall coatings, which, in addition to reproducing the colours and decorative effects (typical also of catalogues commonly on sale), reproduces in an innovative way the feel (coarseness, roughness, thickness) of the final decoration applied on the wall substrate.

An evident advantage of this invention is linked to the fact that it is possible to evaluate, in addition to the colours and to the decorative effects, also the real impact and effective response of the decorative product applied on the wall surface to be decorated, thus facilitating the choice on the part of the consumer of the colour and of the desired effect.

Said purpose is achieved through a careful choice and just the right proportion of the different components of the silk-screen printing ink, in particular through the addition to the main components of the silk-screen printing ink of mineral fillers, preferably silica, of appropriate grain size, aimed at bestowing upon the silk-screen printing ink as printed on a substrate, preferably of a paper type, the feel of coarseness and roughness that the basic paint product will have once applied on a wall substrate.

The ink for silk-screen printing forming the subject of the present invention can be vinyl-based, either shiny or matte, either transparent or covering, in colours pigmented with liquid pigments or metallic-effect pigments. The ink may moreover be fluorescent, phosphorescent, metallic, or with an embossed or thickened effect.

According to the invention, the above purpose is achieved thanks to the solution referred to specifically in the ensuing claims.

DESCRIPTION OF PREFERRED EMBODIMENTS OF THE INVENTION

The invention will now be described in detail in relation to a preferred example of embodiment—preparation of a catalogue for decorative wall products—purely by way of non-limiting examples.

EXAMPLE 1

Ink for Silk-screen Printing Reproducing the Catalogue "Antiche Terre Fiorentine 2"

Starting from a pre-printed card with typographic printing in the colours and decorations required, a silk-screen printing process is adopted for the purpose of bestowing the desired effect (shiny or matte) and of roughness, in particular by adding to the silk-screen printing ink having a base of mineral fillers, preferably quartz (silica) flour, of different grain size, which, mixed with the other components of the ink, yield the feel of roughness proper to the plasters of wall surfaces.

Optionally, additives and/or solvents designed to retard drying of the ink and/or to adjust its viscosity during the application process can be used.

In Table 2 there appears the formulation of an ink for silk-screen printing to obtain a shiny effect (all of the formulations are understood as being expressed in parts by weight).

TABLE 2

| Component | Quantity (parts by weight) |
| --- | --- |
| Transparent shiny ink | from 97.7 to 88 |
| Drying retardant | from 0.5 to 10 |
| Quartz flour 71 μm | from 0.9 to 6 |
| Quartz flour 100 μm | from 0.9 to 6 |
| Solvent for adjusting viscosity | up to 100 |

Amongst the components of the transparent shiny ink, formaldehyde may, for example, be cited. The solvents contained in the transparent shiny ink can be chosen from the group constituted by isobutane, methoxypropanol, methoxypropyl acetate, toluene, ethyl benzene and xylene. The binders consist basically of polyacrylates.

Amongst the components of the drying retardant, it is possible to cite diisopropyl ether, methoxypropanol, aliphatic hydrocarbons with up to 10 carbon atoms, hydroxymethylpentanone, diisoheptyl phthalate and diisononyl phthalate. The binders are basically constituted by polyacrylates.

The mineral fillers used herein and designated as quartz flour are substantially made up of silica $SiO_2$ with the presence, to a lesser degree (almost to the level of impurity) of other compounds, such as $Al_2O_3$, $Fe_2O_3$, etc.

Amongst the components of the solvent for adjusting viscosity, the following may be cited:

1-methyl-2-methoxyethyl acetate;
naphtha solvent from oil 100;
1-methoxy-2 propanol; and
cyclohexanone.

The formulation to obtain the matte effect is given in Table 3.

TABLE 3

| Component | Quantity (parts by weight) |
| --- | --- |
| Transparent matte ink | from 97.7 to 88 |
| Drying retardant | from 0.5 to 10 |
| Quartz flour 71 μm | from 0.9 to 6 |
| Quartz flour 100 μm | from 0.9 to 6 |
| Solvent for adjusting viscosity | up to 100 |

Amongst the components of the transparent matte ink, it is possible to cite the following solvents:

diacetone alcohol;
1,2,4 trimethylbenzene;
1-methyl-2-methoxyethyl acetate;
solvent naphtha from oil 100;
xylene;
mesitylene; and
propylbenzene.

The binders are basically constituted by polymethylmethacrylate.

The formulation of Table 2 or Table 3 is applied on the card that functions as a substrate already printed typographically in the required colours.

For the above purpose, a silk-screen printing frame made of polyester fabric or steel is used. The fabric of the frame can present a woof that is finer or denser (from 10 to 150 threads/cm$^2$) according to what type of ink it is intended to deposit on the substrate card. In the specific case, it can preferably be characterized by a density of 32 threads/cm$^2$ up to 110 threads/cm$^2$.

Once the inking mixture has been applied on the pre-printed card, this is passed (both for the shiny effect and for the matte effect) in the oven for drying. The temperature of the oven can range from 50° C. to 85° C. according to the amount of drying retardant used and for a time that can range from 1 minute to 2 minutes 30 seconds.

The procedure previously described can be repeated a number of times according to the desired effect. By increasing in fact the number of passes there are obtained different shades of colour, thicknesses, and roughness.

EXAMPLE 2

Ink for Silk-screen Printing Reproducing the Catalogue "Antiche Terre Fiorentine Iridescenti e Metallico Gold e Silver"

In order to obtain this catalogue, neutral cards are used. The purpose, as has already been seen, is to obtain colours and decorations (flecks) accompanied by tactile effects of roughness and coarseness as far as possible corresponding to reality, reproducing the decorative finish obtainable on a wall surface.

The non-coloured neutral card is initially printed by silk-screen printing in order to obtain the base.

For the above purpose, the formulation appearing in Table 4 is used (the colour will be different according to the pigment used).

TABLE 4

| Component | Quantity (parts by weight) |
| --- | --- |
| Water | up to 100 |
| Sodium hexamethaphosphate | from 0.1 to 0.5 |
| Anti-foaming agent | from 0.1 to 0.5 |
| Thickener | from 0.2 to 0.9 |
| Preserving agent | from 0.7 to 2.5 |
| Wetting agent | from 0.2 to 1.1 |
| Pigment | from 2 to 10 |
| Calcium carbonate | from 19 to 48 |
| Calcined china clay | from 0.5 to 8 |
| Propylene glycol | from 1 to 6 |
| Coalescent | from 0.3 to 1.5 |
| Versatic vinyl emulsion in aqueous phase | from 5 to 20 |
| 2-amino-2-methyl-1-propanol | from 0.1 to 0.5 |
| Quartz flour | from 1 to 10 |
| Colouring toner (different for each colour in the catalogue) | from 10 to 20 |

The formulation of Table 4 is used for spreading out and printing the iridescent base. This composition is spread over the first frame for the first printing pass. In the second pass, a composition that will print the first white fleck attenuated in the colour will be used (Table 5). The next pass will print (with an appropriate formulation reproduced in Table 6) the more intense and definite white fleck in the colour. The fourth and final printing pass will impart on the card substrate the metallic or iridescent effect and the feel of roughness (ink appearing in Table 7).

The four printing passes are set apart from one another by the exposure of the card treated with fast drying using IR lamps and a final drying in an oven, the temperature of which may range from 50° C. to 85° C.

The formulation of the ink designed to print the whitest fleck attenuated in the colour is the one given below (Table 5).

TABLE 5

| Component | Quantity (parts by weight) |
| --- | --- |
| Water | up to 100 |
| Sodium hexamethaphosphate | from 0.1 to 0.5 |
| Cellulose thickener | from 0.5 to 2 |
| Wetting agent | from 0.1 to 0.5 |
| Dispersing agent | from 0.05 to 0.3 |
| Anti-foaming agent | from 0.05 to 0.3 |
| Coalescent | from 0.4 to 1.2 |
| Hexylene glycol | from 1 to 7.5 |
| Propylene glycol | from 0.05 to 0.5 |
| Ethylene glycol | from 0.05 to 1.5 |
| Acrylic emulsion in aqueous phase | from 10 to 25 |
| Silicone anti-foaming agent | from 0.2 to 0.5 |
| 2-Amino-2-methyl-1-propanol | from 0.05 to 1 |
| Preserving agent | from 0.15 to 0.5 |
| Pigment | from 3 to 10 |
| Calcined china clay | from 1 to 5 |
| Talcum | from 1 to 5 |
| Brown pigment | from 0.005 to 0.008 |
| Yellow pigment | from 0.008 to 0.030 |
| Black pigment | to 0.002 to 0.008 |
| Thickener | from 0.200 to 0.700 |

The formulation of the ink designed to print the white fleck that is most intense in the tonality of tint is given below in Table 6.

TABLE 6

| Component | Quantity (parts by weight) |
| --- | --- |
| Water | up to 100 |
| Sodium hexamethaphosphate | from 0.200 to 1 |
| Cellulose thickener | from 0.200 to 1.5 |
| Wetting agent | from 0.500 to 1.5 |
| Dispersing agent | from 0.010 to 0.2 |
| Anti-foaming agent | from 0.100 to 0.5 |
| Coalescent | from 0.300 to 1.2 |
| Hexylene glycol | from 1 to 3 |
| Propylene glycol | from 0.100 to 1.5 |
| Ethylene glycol | from 0.200 to 0.8 |
| Acrylic emulsion in aqueous phase | from 10 to 25 |
| Silicone anti-foaming agent | from 0.100 to 0.7 |
| 2-amido-2-methyl-1-propanol | from 0.050 to 0.5 |
| Preserving agent | from 0.400 to 1.3 |
| Pigment | from 15 to 30 |
| Calcined china clay | from 5 to 12 |
| Talcum | from 1 to 9 |
| Brown pigment | from 0.004 to 0.01 |
| Yellow pigment | from 0.004 to 0.01 |
| Thickener | from 0.050 to 1 |

To obtain the iridescent effect (in six different tonalities of tint according to the particular pigment used) or metallic effect (gold, silver, etc.) and at the same time to bestow upon the catalogue the typical effect of the roughness and thickness of the wall to be decorated, recourse is had to the formulation given in Table 7.

TABLE 7

| Component | Quantity (parts by weight) |
|---|---|
| Water | up to 100 |
| Sodium hexamethaphosphate | from 0.05 to 0.5 |
| Cellulose thickener | from 1 to 1.9 |
| Wetting agent | from 0.05 to 0.5 |
| Dispersing agent | from 0.05 to 0.4 |
| Anti-foaming agent | from 0.1 to 0.6 |
| Coalescent | from 0.3 to 1.5 |
| Hexylene glycol | from 1 to 8 |
| Acrylic emulsion in aqueous phase | from 12 to 30 |
| Silicone anti-foaming agent | from 0.1 to 0.5 |
| Thickener | from 0.1 to 0.7 |
| 2-amino-2-methyl-1-propanol | from 0.05 to 0.4 |
| Preserving agent | from 0.2 to 1 |
| Pigment with iridescent or metallic effect | from 5 to 15 |
| Quartz flour 71 μm | from 1 to 6 |
| Quartz flour 100 μm | from 1 to 6 |

At the end of these four passes of silk-screen printing, the card will be subjected to a passage in the oven for final drying. The temperature of the oven may range from 50° C. to 85° C. for a period of time from 1 minute to 2 minutes 30 seconds.

EXAMPLE 3

Ink for Silk-screen Printing Reproducing the Catalogue of "Antiche Terre Fiorentine Perlescenti"

In order to obtain this particular catalogue, non-pre-printed neutral cards are used.

The non-coloured neutral card is printed by silk-screen printing in order to obtain the base.

For said purpose, the general formulation of Table 8 (the colour will be different for the six catalogue colours, and this will be obtained by varying the pigments within the formulation) is used.

TABLE 8

| Component | Quantity (parts by weight) |
|---|---|
| Water | up to 100 |
| Sodium hexamethaphosphate | from 0.1 to 0.5 |
| Anti-foaming agent | from 0.1 to 0.7 |
| Thickener | from 0.3 to 1 |
| Preserving agent | from 0.2 to 0.8 |
| Wetting agent | from 0.1 to 0.5 |
| Pigment | from 3 to 18 |
| Calcium carbonate | from 20 to 40 |
| Calcined china clay | from 2 to 5 |
| Propylene glycol | from 0.5 to 2.5 |
| Coalescent | from 0.5 to 1.5 |
| Dimmer | from 0.5 to 5 |
| Acrylic emulsion in aqueous phase | from 8 to 20 |
| Mould repellent | from 0.5 to 1 |
| 2-amino-2-methyl-1-propanol | from 0.1 to 0.5 |
| Quartz flour 100 μm | from 5 to 15 |

This formulation will be spread on a first frame for a first pass of silk-screen printing so as to produce the card with the base in the desired colour. In the second pass of silk-screen printing, an ink will be provided for the printing of the fleck type attenuated in the colour (Table 9), and subsequently in a third pass the iridescent/pearly effect will be created, and the required effect of roughness will be provided (Table 10). The last pass will use a formulation designed to print the more intense fleck that is defined in the colour (Table 11).

The four printing passes are set apart from one another by exposure of the treated cards to fast drying using infrared lamps and to a final drying in the oven, the temperature of which may range from 50° C. to 85° C.

The formulation of the printing ink for production of the fleck attenuated in the colour is given in Table 9.

TABLE 9

| Component | Quantity (parts by weight) |
|---|---|
| Water | up to 100 |
| Sodium hexamethaphosphate | from 0.1 to 0.6 |
| Preserving agent | from 0.2 to 0.6 |
| Anti-foaming agent | from 0.1 to 0.5 |
| Cellulose thickener | from 0.2 to 1.2 |
| Wetting agent | from 0.2 to 0.6 |
| Dispersing agent | from 0.01 to 0.2 |
| Silicone anti-foaming agent | from 0.05 to 0.2 |
| Coalescent | from 0.5 to 1.5 |
| Hexylene glycol | from 0.6 to 1.5 |
| Acrylic emulsion in aqueous phase | from 5 to 15 |
| Thickener | from 0.05 to 0.9 |
| 2-amino-2-methyl-1-propanol | from 0.1 to 0.4 |
| Pigment | from 7 to 20 |
| Calcium carbonate | from 15 to 35 |
| Calcined china clay | from 2 to 7 |
| Propylene glycol | from 0.4 to 1.5 |
| Dimmer | from 0.5 to 2 |
| Vinylic emulsion in aqueous phase | from 4 to 10 |
| Mould repellent | from 0.5 to 1 |
| Ethylene glycol | from 0.1 to 0.8 |
| Talcum | from 1 to 5 |
| Quartz flour 100 μm | from 2 to 8 |

The iridescent/pearly effect in the six different tonalities of tint according to the particular pigment employed will be obtained using the ink the formulation of which is given in Table 10.

TABLE 10

| Component | Quantity (parts by weight) |
|---|---|
| Water | up to 100 |
| Sodium hexamethaphosphate | from 0.05 to 0.5 |
| Cellulose thickener | from 1 to 1.9 |
| Wetting agent | from 0.05 to 0.5 |
| Dispersing agent | from 0.05 to 0.4 |
| Anti-foaming agent | from 0.1 to 0.6 |
| Coalescent | from 0.3 to 1.5 |
| Hexylene glycol | from 1 to 8 |
| Acrylic emulsion in aqueous phase | from 12 to 30 |
| Silicone anti-foaming agent | from 0.1 to 0.5 |
| Thickener | from 0.1 to 0.7 |
| 2-amino-2-methyl-1-propanol | from 0.05 to 0.4 |
| Preserving agent | from 0.2 to 1 |
| Pigment with iridescent or metallic effect | from 5 to 15 |
| Quartz flour 71 μm | from 1 to 6 |
| Quartz flour 100 μm | from 1 to 6 |

During this printing step, the typical effect of roughness and thickness will moreover have already been bestowed upon the wall surface to be plastered, by using quartz flour with a different grain size.

The formulation of the ink for printing the fleck of intense and definite colour is given in Table 11.

TABLE 11

| Component | Quantity (parts by weight) |
| --- | --- |
| Neutral paste | from 90 to 99.9 |
| Pigments | from 10 to 0.1 |

Amongst the solvents contained in the neutral paste, it is possible to cite benzene, toluene, ethyl benzene, xylene, aliphatic hydrocarbons with up to 8 carbon atoms, and alkyl benzenes. The binders contained in the neutral paste are basically constituted by polyacrylates.

The pigments vary in the tints and in the amounts according to the colours that it is desired to reproduce.

At the end of these four passes, the card that has thus undergone silk-screen printing is subjected to a further pass for final drying for 1 minute to 2 minutes 30 seconds.

EXAMPLE 4

Ink for Silk-screen Printing Reproducing the Catalogue "Ori e Argenti"

Starting from the card pre-printed with typographic printing in the colours and decorations required, silk-screen printing will be carried out with two distinct passes, with inks specially designed for the purpose of reproducing the effect both of desired colouring and of desired roughness.

The decoration "Ori e Argenti" is present in two variants, namely in the gold variant and in the silver variant.

The formulation used in the first pass of silk-screen printing both for the gold effect and for the silver effect is given in Table 12.

TABLE 12

| Component | Quantity (parts by weight) |
| --- | --- |
| Transparent matte ink | from 99.5 to 90 |
| Drying retardant | from 0.5 to 10 |
| Quartz flour 71 µm | from 1 to 6 |
| Quartz flour 100 µm | from 1 to 6 |
| Solvent for adjusting viscosity | up to 100 |

The quartz flours of different grain size that are present in the mixture of the inks provide the feel of roughness proper to plasters and wall surfaces. It is also possible to use additives and solvents designed to retard the drying of the ink and in particular the viscosity during the time of application.

In the next pass of silk-screen printing, the gold variant will be differentiated from the silver one. The formulation of the printing ink designed to print the gold variant is given in Table 13.

TABLE 13

| Component | Quantity (parts by weight) |
| --- | --- |
| Water | up to 100 |
| Sodium hexamethaphosphate | from 0.100 to 0.500 |
| Cellulose thickener | from 0.700 to 1.900 |
| Wetting agent | from 0.100 to 0.600 |
| Dispersing agent | from 0.050 to 0.300 |
| Silicone anti-foaming agent | from 0.3 to 1 |
| Coalescent | from 0.300 to 2 |
| Hexylene glycol | from 1 to 8 |
| Acrylic emulsion in aqueous phase | from 10 to 30 |
| Thickener | from 0.100 to 1.500 |
| 2-amino-2-methyl-1-propanol | from 0.100 to 0.600 |
| Preserving agent | from 0.200 to 1 |
| Pigment with gold metal effect | from 2 to 10 |

The silver variant will have the same formulation and will vary only in the choice of the pigment with metallic effect, which in this case will have a silver metal effect.

Also in this case, at the end of the two printing passes, the card will be subjected to a pass in the oven for a final drying at a temperature of between 50° C. and 85° C. and for a period of between 1 minute and 2 minutes 30 seconds.

Of course, without prejudice to the principle of the invention, the details of implementation and the embodiments may vary widely with respect to what is described and illustrated herein purely by way of example, without thereby departing from the sphere of protection of the present invention.

The invention claimed is:

1. A method for the production of a leaflet that presents a predetermined coarseness that generally mimics the coarseness of a decorative wall product when applied on a wall surface, comprising the steps of:
   providing a paper card support;
   formulating an ink;
   applying said ink to a paper card support;
   wherein the step of formulating the ink comprises formulating an ink having a base of mineral fillers in an amount comprised in a range from 0.9 to 20 parts by weight, and having a grain size of between 50 µm, and 250 µm, whereby the resulting coarseness of the leaflet is between 50 µm and 250 µm and generally mimics the coarseness of a decorative wall product applied to a wall.

2. The method according to claim 1, wherein said mineral fillers are constituted substantially by silica.

3. The method according to claim 1, wherein said grain size is preferably between approximately 70 µm and approximately 100 µm.

4. The method according to claim 1, wherein said mineral fillers comprise flours of different grain size.

5. The method according to claim 4, wherein said flours include a first flour and a second flour, each flour having a grain size less than 150 µm.

6. The method according to claim 5, wherein each of said first flour and said second flour has a grain size between approximately 70 µm and approximately 100 µm.

7. The method according to claim 1, wherein to said mineral fillers is associated with a binding part.

8. The method according to claim 7, wherein said binding part is constituted by at least one vehicle, at least one modifier and at least one solvent.

9. The method according to claim 8, wherein said vehicle is selected from among the group constituted by vinyl, acrylate, polyurethane, epoxy, nitro-cellulose, maleic, polyester, melamine, phenol-formaldehyde, urea-formaldehyde, and alkyd resins.

10. The method according to claim 9, further comprising the step of:
   passing said paper card support including said ink in an oven for drying at a temperature ranging from 50° C. to 85° C.

11. The method according to claim 10, wherein said paper card support including said ink is passed in said oven at said temperature for a time ranging from 1 minute to 2 minutes, 30 seconds.

12. The method according to claim 8, wherein said modifier is selected from among the group constituted by phthalic, sebacic and glycolic acids and their derivatives, linseed oils, soya oils, wood oils, carnauba wax, polyethylene waxes, salts of manganese, zinc, cobalt and zirconium of naphthalene, octoic, linoresinic acids, and coalescent agents.

13. The method according to claim 12, wherein said modifier is constituted by esters of phthalic acids.

14. The method according to claim 12, wherein said modifier is constituted by a coalescent agent.

15. The method according to claim 8, wherein said solvent is selected from among the group constituted by water, aliphatic hydrocarbons with up to 10 carbon atoms, isobutane, alkyl benzenes, methoxypropanol, hydroxymethylpentanone, methoxypropyl acetate, benzene, toluene, ethyl benzene, xylene, and diisopropyl ether.

16. The method according to claim 15, wherein said solvent is constituted by water.

17. The method according to claim 15, wherein said solvent is constituted by methoxypropanol.

18. The method according to claim 7, wherein said binding part is constituted by vinyl resins, phthalic acids, and water.

19. The method according to claim 7, wherein said binding part is constituted by acrylate resins, coalescent agent, and methoxypropanol.

20. The method according to claim 1, wherein a technique of silk-screen printing is used to apply the ink to the card support whereby the resulting thickness of the ink generally mimics the thickness of a decorative wall product applied to a wall.

21. The method according to claim 20, wherein said technique deposits on the card support an average thickness of ink between approximately 50 μm and approximately 100 μm at each printing pass.

22. The method according to claim 20, wherein said technique envisages at least two printing passes on the card support.

23. The method according to claim 20, wherein said technique envisages a number of printing passes equal or grater than two and less than ten on the card support.

24. The method according to claim 20, wherein said technique bestows upon the card support a thickness of between 200 μm and 900 μm.

25. The method according to claim 20, wherein said technique bestows upon the card support a thickness of preferably less than 800 μm.

26. Method for the production of a leaflet, the leaflet comprising:
   a paper card support; and
   a printing reproduction of a decorative wall product onto said paper card support, said printing reproduction presenting roughness, coarseness and/or thickness of the decorative wall product applied on a wall surface;
   the method comprising the step of applying on the paper card support an ink for silk-screen comprising mineral fillers, to reproduce the decorative wall product, said mineral fillers being in an amount ranging from 0.9 to 20 parts by weight and comprising a first flour and a second flour of different grain size, each said flour having a grain size less than 150 μm whereby the resulting coarseness of the leaflet generally mimics the coarseness of a decorative wall product applied to a wall.

27. Method for the production of a leaflet, the leaflet comprising:
   a paper card support; and
   a printing reproduction of a decorative wall product onto said paper card support, said printing reproduction presenting roughness, coarseness and/or thickness of the decorative wall product applied on a wall surface;
   wherein the method comprises the steps of:
   applying on the paper card support an ink for silk-screen comprising mineral fillers, to reproduce the decorative wall product; and
   passing said paper card support in an oven for drying;
   and wherein
   said mineral fillers are in an amount ranging from 0.9 to 20 parts by weight and comprises a first flour and a second flour of different grain size, each said flour having a grain size less than 150 μm whereby the resulting coarseness of the leaflets generally mimics the coarseness of a decorative wall product applied to a wall; and
   once said ink has been applied on the paper card support, the paper card support is passed in an oven for drying at a temperature ranging from 50° C. to 85° C.

* * * * *